INVENTOR
WINNER F. DELP
BY
Seidel & Gonda
ATTORNEYS.

INVENTOR
WINNER F. DELP
BY Seidel & Gonda
ATTORNEYS.

INVENTOR
WINNER F. DELP

BY Seidel & Gonda
ATTORNEYS.

INVENTOR
WINNER F. DELP
BY Seidel & Gonda
ATTORNEYS.

INVENTOR
WINNER F. DELP
BY Seidel & Gonda
ATTORNEYS.

United States Patent Office 3,531,198
Patented Sept. 29, 1970

3,531,198

METHOD OF PRINTING IMAGES ON OPPOSITE SIDES OF A SUBSTRATE

Winner F. Delp, Fort Washington, Pa., assignor to The Jade Corporation, Beth Ayres, Pa., a corporation of Pennsylvania Continuation-in-part of application Ser. No. 455,857, May 14, 1965. This application June 27, 1966, Ser. No. 560,454
Int. Cl. G03b 27/32
U.S. Cl. 355—26 2 Claims

ABSTRACT OF THE DISCLOSURE

Apparatus and method for producing aligned images on opposite sides of a planar substrate. Two photographic plates are aligned and an opaque barrier is then inserted therebetween. The plates are simultaneously exposed. The plates are simultaneously moved to expose other areas. The plates are moved together by the same mechanism so that any displacement error will effect both plates in an identical manner. After exposure is completed, the plates are removed and developed. The developed plates are then placed in close proximity and re-aligned. A substrate is then inserted between the plates and is contact printed thereby.

This application is a continuation-in-part of my copending application Ser. No. 455,857, filed on May 14, 1965 and now Pat. No. 3,399,593 and entitled "Precision Art Work Duplicating Machine." The disclosure thereof is incorporated herein by reference.

This invention relates to a precision double image duplicating machine, and more particularly, to a machine for simultaneously duplicating double images of art work patterns with identical accuracy and with a higher degree of accuracy than that known heretofore. The machine of the present invention facilitates duplicating double images in an orientated pattern repetitively with a high degree of accuracy.

The production of two images on opposite sides of a substrate with the images orientated with respect to one another is a difficult and time-consuming task which can result in errors of orientation. Heretofore, the producing of images on opposite sides of a substrate have, to my knowledge, never been accomplished simultaneously. When these images are applied one at a time, or to one sides and then the substrate reversed, there is substantial duplication of effort, substantial material handling, numerous occasions for introduction of orientation errors, and numerous opportunities for the substrate to be soiled or otherwise accumulate foreign matter on its surfaces.

The present invention is useful in the production of substrates such as stainless steel or molybdenum plates having a thickness of about .001 to .010 inch and adapted to be used as masks in the production of microcircuits. However, the substrate can be a silicon wafer on which microcircuits are applied to its opposite major faces with the respective images or circuitry orientated with respect to one another. At the same time, the images and/or circuitry are generally in the nature of a repetitive pattern on each face of the substrate. It is important that the spacing between the images or circuitry is consistent and that any initial error in orientation be repeated so that other equipment adapted to cooperate or be utilized with the substrate may be adjusted to compensate for such repetitive errors. The images or circuitry on opposite faces of the substrate need not be identical as will be made clear hereinafter.

It is an object of the present invention to provide a novel apparatus and method for producing substrates having images on opposite surfaces thereof which are orientated with respect to one another.

It is another object of the present invention to provide novel apparatus and method for simultaneously producing a plurality of images on opposite faces of the substrate with a consistent error and orientation pattern.

It is another object of the present invention to provide a method and apparatus for producing a plurality of separate images on opposite faces of a substrate in a manner which is simple, economical, rapid and avoids introducing errors which are not consistently repeated.

Other objects may appear hereinafter.

For the purpose of illustrating the invention, there are shown in the drawings forms which are presently preferred; it being understood, however, that this invention is not limited to the precise arrangements and instrumentalities shown.

Referring to the drawing in detail, wherein like numerals indicate like elements, there is shown in FIG. 1 a precision double image duplicating machine in accordance with the present invention designated generally as 10.

Figures 1, 8, 9:
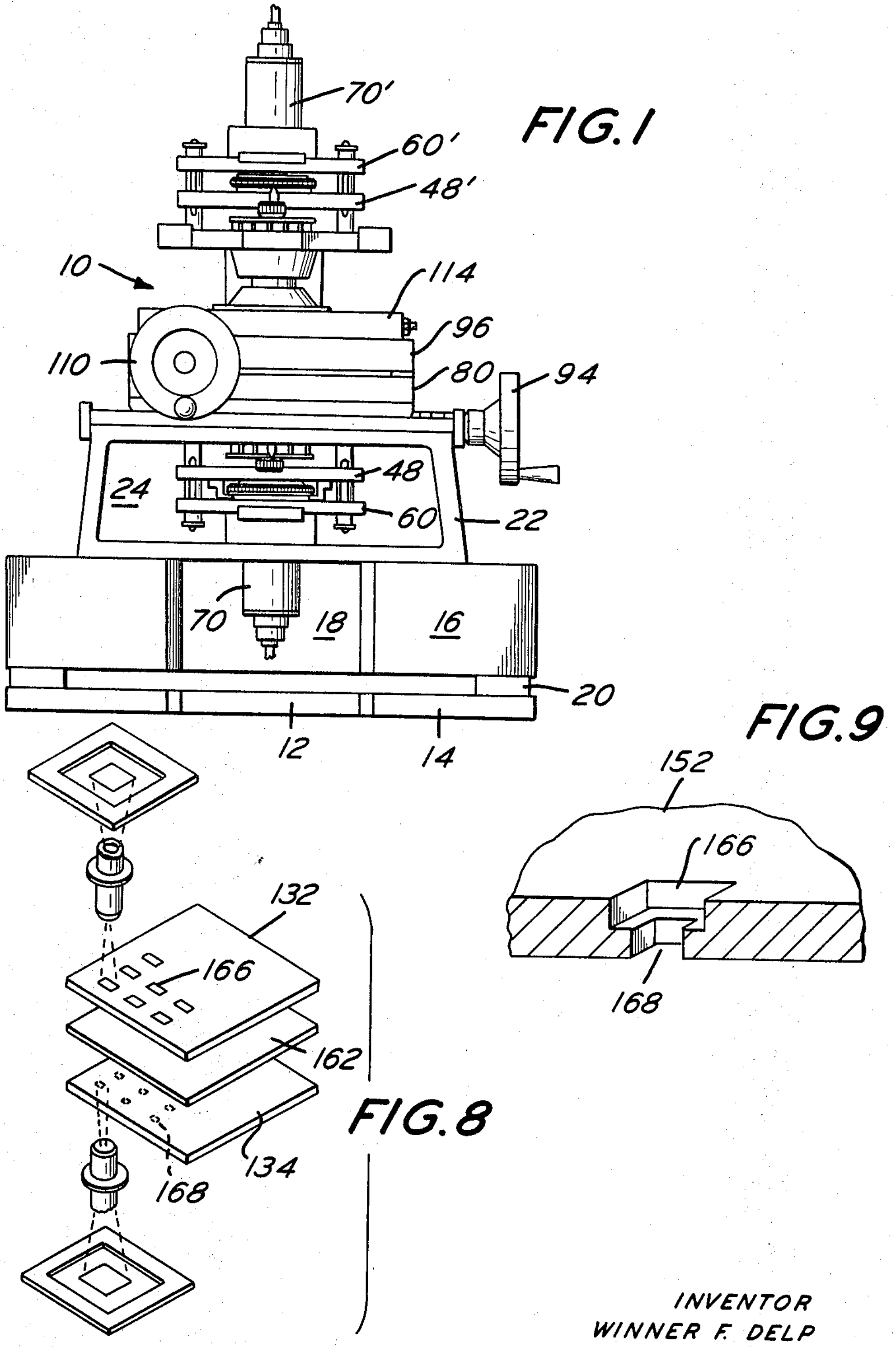
FIG. 1 is a front elevation view of a machine in accordance with the present invention.
FIG. 8 is a diagrammatic exploded view illustrating the manner in which images are applied to photographic plates.
FIG. 9 is a perspective view partially in section illustrating a portion of the substrate produced in accordance with the present invention.

The machine 10 may include a generally horseshoe-shaped base 14 having a recess 12 extending from a front edge thereof. A support frame 16 is mounted on the base or any stable surface by means of a plurality of corner posts 20. The frame 16 is provided with a recess 18 similar to and superimposed over the base recess 12. If desired, the base 14 and frame 16 may be made integral as a one-piece unit.

A main frame 22 is supported by the upper surface of the frame 16. As shown more clearly in FIG. 3, the main frame 22 is a hollow member having its open end juxtaposed to the frame 16. Frame 22 has a centrally disposed hub 26 and an axis opening 24 on a front face thereof. Opening 24 is shown more clearly in FIGS. 1 and 3. Bolts 28, or other equivalent structure, may be utilized to releasably secure the frame 22 to the frame 16.

Figure 4:
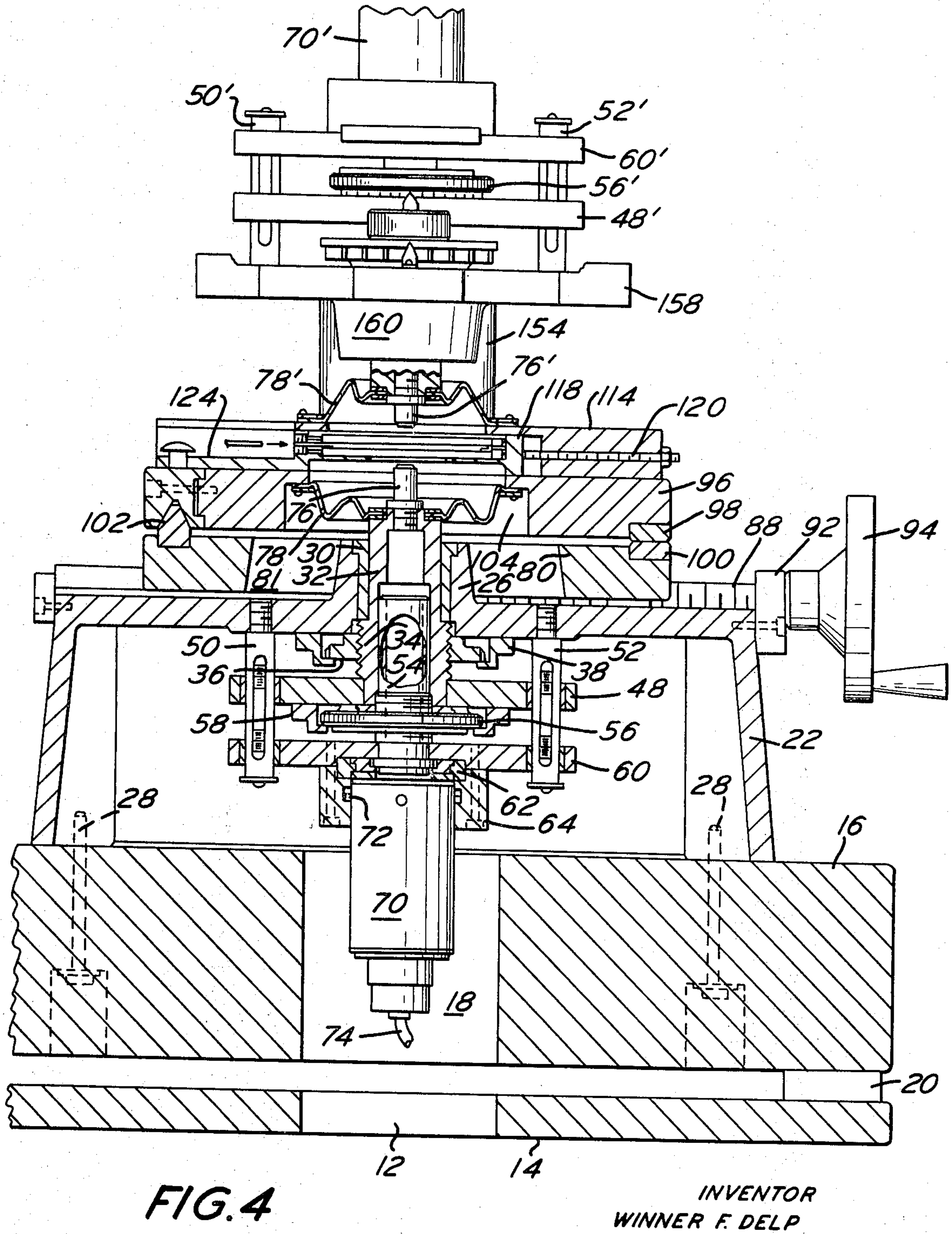
FIG. 4 is a sectional view taken along the line 4—4 in FIG. 3.

As shown more clearly in FIG. 4, a sleeve bearing 30 is disposed within the hub 26. Bearing 30 slidably receives a hollow shaft 32 having an enlarged diameter threaded portion 34 at its lower end. Threaded portion 34 abuts against one end of bearing 30 in the uppermost position of shaft 32 as illustrated. A gear 36 is provided having threads on its inner periphery meshed with threads on the outer periphery of portion 34. A bracket means 38 is provided on the inner surface of the horizontally disposed wall of frame 22 to retain the gear 36 juxtaposed thereto. Thus, the gear 36 is disposed only for rotary motion and restrained against motion in an axial direction.

Figure 3:
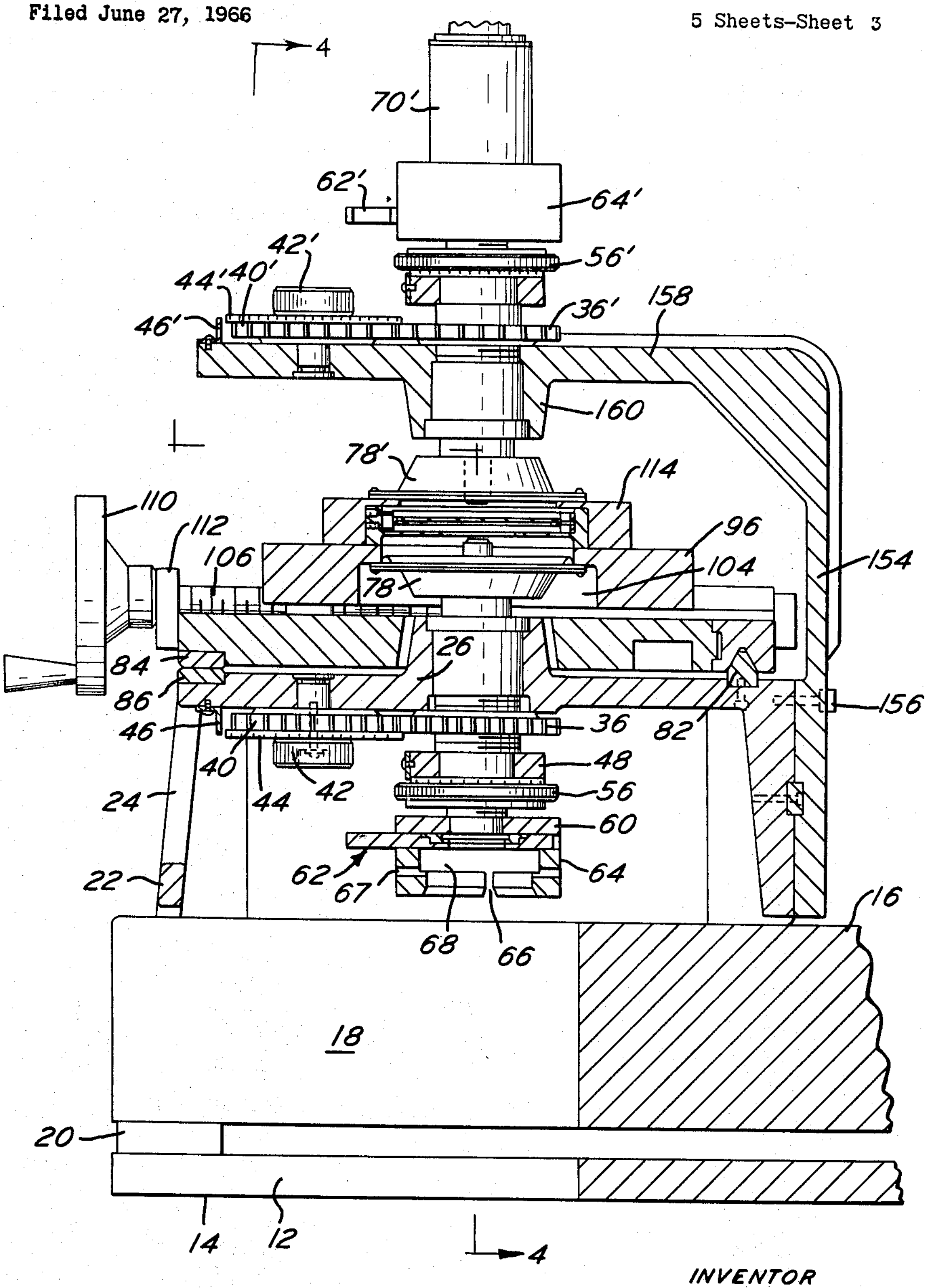
FIG. 3 is a sectional view taken along the line 3—3 in FIG. 2.

As shown more clearly in FIG. 3, gear 36 is meshingly engaged with gear 40. Gear 40 is suitably journaled in the horizontally disposed wall of the frame 22. A suitable manually operable knob 42 is provided for rotating gear 40 which in turn will rotate gear 36 to effect a raising or lowering of the shaft 32. A suitable graduated scale 44 is mounted for rotation with the gear 40. A pointer 46 is supported by the main frame 22 adjacent the outer periphery of scale 44. Scale 44 and pointer 46 are visible through the access opening 24 as shown more clearly in FIG. 1.

A first plate is supported by the lower end of shaft 32 below the enlarged diameter portion 34. Plate 48 is provided with apertures at opposite ends which are provided with bearings. A pair of guide rod members 50 and 52 are supported by the horizontally disposed wall of the main frame 22 in depending relation. Each of the members 50 and 52 extends through one of the bearings in the plate 48. The relationship between the plate 48 and the members 50 and 52 assures that the shaft 32 will not rotate, but rather will be mounted for up and down reciprocatory movement.

A shaft 54 is telescoped within and slidably guided by the inner surface wall of shaft 32. The lower end of shaft 54 is provided with external threads in meshing engagement with threads on the inner surface of an adjusting wheel 56. Wheel 56 is supported by brackets 58 depending from the lowermost surface of plate 48. The only relative motion between wheel 56 and plate 48 is rotary motion of the former with respect to the latter. Thus, wheel 56 will move up and down with the plate 48.

A second plate 60 is secured to the lowermost end of shaft 54. The guide rod members 50 and 52 extend through corresponding openings in plate 60 so that the latter is guided only for up and down reciprocatory type movement. Adjustment of wheel 56 will effect up and down movement of plate 60 toward and away from plate 48. Rotation of knob 42 will effect up and down movement of plates 48 and 60 as a unit.

A mounting block 64 is coupled to plate 60 by bolts or the like. An art work support structure designated generally as 62 is slidably supported within mating grooves on the member 60 and block 64. Structure 62 is adapted to removably support art work which is to be applied to master photographic plates as will be described hereinafter. The art work preferably is a photographic image.

The mounting block 64 is provided with a centrally located aperture and a plurality of circumferentially disposed axially directed slots 66. See FIG. 3. The slots 66 terminate at a shoulder defining a groove 68 within the mounting block 64. The reduction printer 70 is provided with radially outwardly directed projections 72 corresponding in number to the number of slots 66.

The reduction printer 70 is releasably supported by the mounting block 64. Such support is effected by aligning the projections 72 with the slot 66, moving the printer 70 in an axial direction in FIG. 4 until the projections are in the grooves 68, and then rotating the printer 70 until projections 72 drop into radially directed bores 67. Thus, the releasable mounting for the printer 70 is similar to a bayonet type mounting.

The reduction printer 70, per se, is of conventional construction and includes a printing light source of variable intensities. A cable 74 extends from the printer 70 to any conventional selectively operable triggering device.

The opening on the upper surface of the reduction printer 70 is coaxially aligned with the hollow shafts 32 and 54. A lens 76 is adjustably and releasably coupled in an axial disposition at the upper end of shaft 32. The inner peripheral surface of a bellows 78 is releasably coupled to an outer peripheral portion of the upper end of shaft 32. Bellows 78 may be made from any one of a wide variety of material including fabric so long as the material will not transmit light therethrough.

An X–Y axis stage device is provided for selective orientation of substrates adapted to have a pattern of images applied thereto with respect to the reduction printer 70. Such devices include a support plate member 80 having an axially disposed opening 81. The hub 26 extends into the opening 81. As shown by a comparison of FIGS. 3 and 4, opening 81 is elongated. A bearing guide surface such as that provided by gib 82 is provided with mating bearing surfaces on the plate member 80. The longitudinal axis of gib 82 is parallel to the longitudinal axis of opening 81. Gib 82 is adjustably and releasably supported on the main frame 22. The main frame 22 also includes a way 86 in sliding engagement with a way 84 on the lowermost surface of member 80. See FIG. 3.

Figure 2:
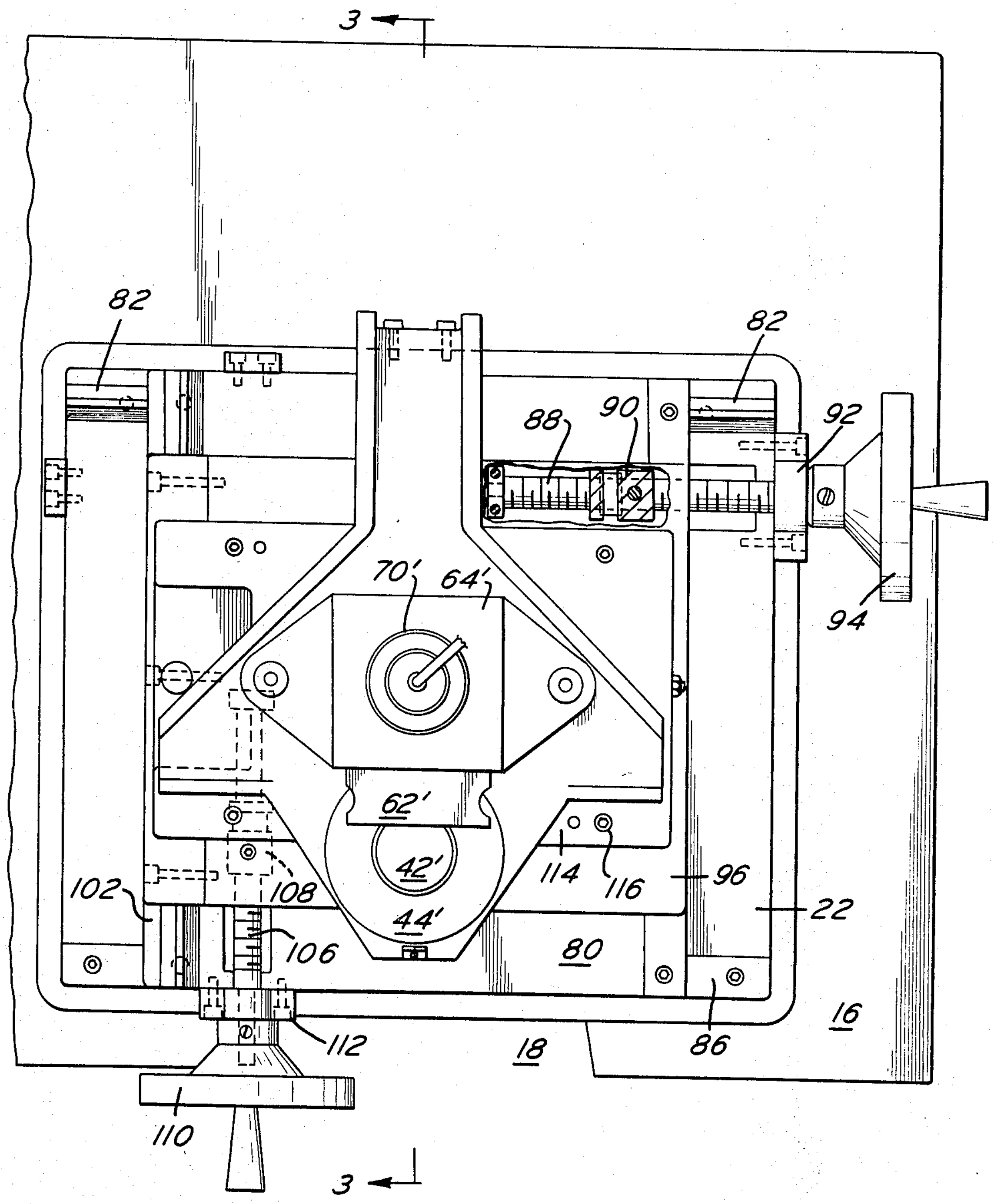
FIG. 2 is a top plan view thereof.

A threaded shaft 88, as shown more clearly in FIGS. 2 and 4, extends parallel to the gib 82. Shaft 88 is threadedly engaged with bearing block 90 which in turn is engaged with member 80. Shaft 88 is also threadedly supported by a collar 92 on the main frame 22 and terminates in a hand wheel 94. Rotation of the hand wheel 94 will cause non-reciprocatory rotative movement for the shaft 88 which in turn will cause reciprocation of the member 80 toward and away from the collar 92 as guided by the gib 82 and the way 86.

The above-described portion of the X–Y stage device facilitates movement in the X direction. The elements which effect movement in the Y direction are supported thereby and are as follows. A second support plate member 96 is slidably disposed on the upper surface of the plate member 80 for movement toward and away from the longitudinal axis of the gib 82. Such movement may be effected by means of a gib 102 releasably and adjustably supported on the upper surface of member 80, and disposed so as to be perpendicular to the longitudinal axis of shaft 88. See FIG. 4. A way 100 is provided on the upper surface of member 80 for sliding engagement with a way 98 on a lower surface of member 96. See FIG. 4.

The member 96 is provided with a stepped opening at 104. The outer periphery of the bellows 78 is tightly secured to the shoulder in the stepped opening 104. A threaded shaft 106 is threadedly meshed with and supported by a bearing block 100 which in turn is engaged or otherwise connected to member 96 by means of a pin and bushing. The shaft 106 is also meshed with internal threads on a collar 112. Collar 112 is releasably supported by the member 80. A hand wheel 110 is coupled to shaft 106. Shaft 106 will have a rotatable but non-reciprocal type movement effected by rotation of hand wheel 110. Rotating hand wheel 110 will effect reciprocation of member 96 toward and away from the longitudinal axis of gib 82.

Figures 5, 6, 7:
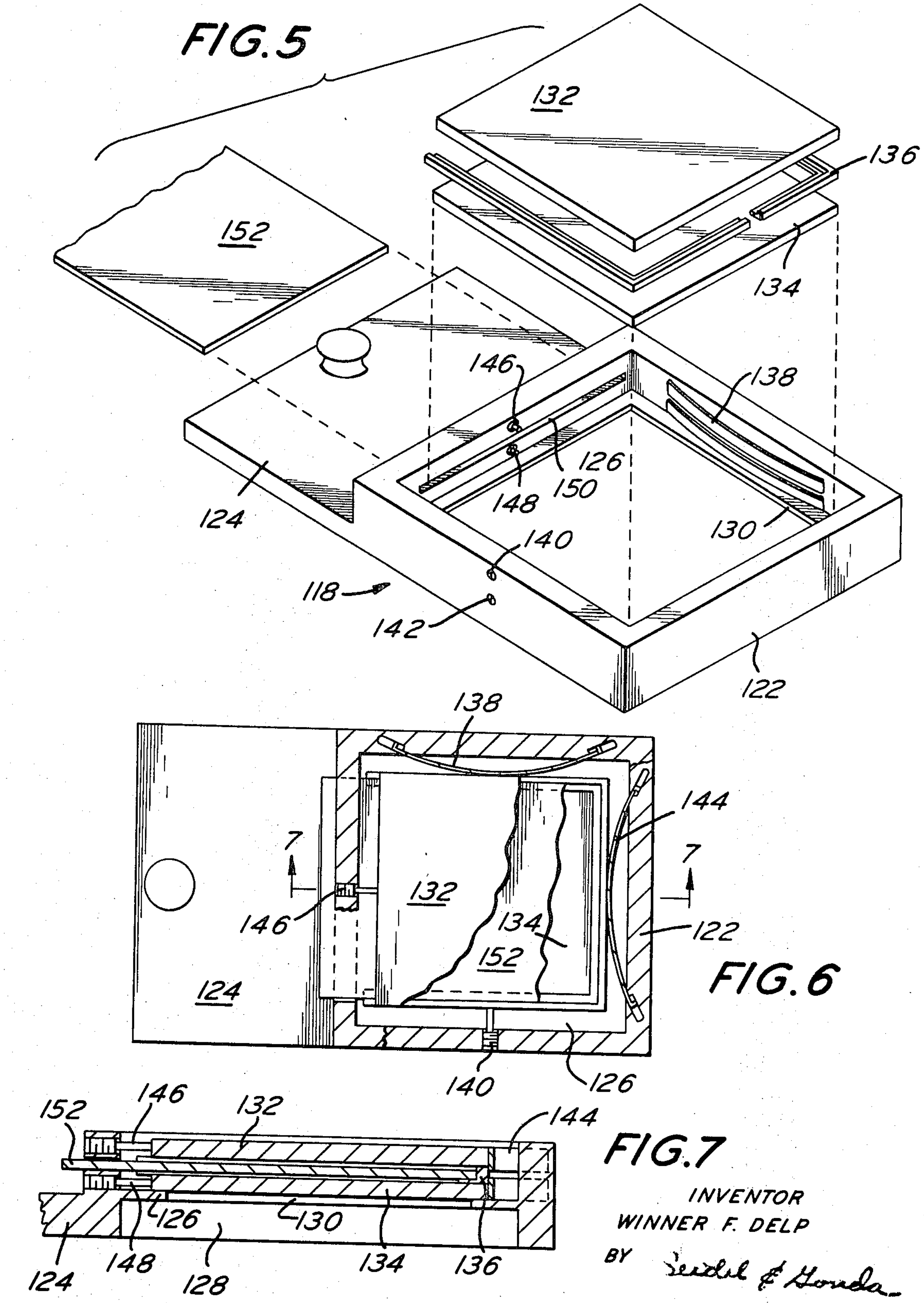
FIG. 5 is an exploded view of photographic plates, substrate, and a supporting means therefor.
FIG. 6 is a sectional view of the apparatus illustrated in FIG. 5.
FIG. 7 is a sectional view taken along the line 7—7 in FIG. 6.

A mask plate member 114 is supported on the upper surface of member 96 and coupled thereto by means of a plurality of bolts 116. Member 114 is provided with a centrally disposed aperture in line with the lens 76. A plate holder 118 is provided and slidably supported on the upper surface of member 96 within a recess on the lowermost surface of member 114. Holder 118 is shown more clearly in FIGS. 5–7 and will be described in greater detail hereinafter. A limit stop 120 is provided on the member 114 for limiting the rearmost position of a face on holder 118.

Holder 118 includes a rectangular body having an inwardly directed horizontally disposed wall 126. A recess 128 is provided in the body below the wall 126. Wall 126 is provided with an aperture 130 in a central portion thereof. Photographic plates 132 and 134, separated by a U-shaped spacer 136, are supported by wall 126. Springs 138 bias the plates 132 and 134 against adjustable limit stops 140 and 142 respectively.

Springs 144 bias the plates 132 and 134 against adjustable limit stops 146 and 148 respectively. The body 122 is provided with an elongated slot 150 between the limit stops 146 and 148. An opaque barrier 162 is adapted to be slid through the slot 150 into the space between the plates 132 and 134.

A main support arm 154 is releasably coupled to a rear face of the main frame 22 by means of bolts 156. The arm 154 may be a casting having interconnected longitudinal transverse ribs for purposes of rigidity. The arm 154 is provided with a horizontally disposed portion 158 having a hub 160. A reduction printer and the adjusting mechanism therefor is supported by portion 158 and hub 160 and directed downwardly. This reduction printer and its associated mechanisms are identical to the one described above. Accordingly, corresponding structure is provided with primed numerals. The bellows 78' has its outer periphery secured to the upper surface of plate member 114.

The remaining structure and FIGS. 8 and 9 in particular are deemed to be best described in connection with the following description of operation.

Photographic plates 132 and 134 are superimposed over one another with an opaque barrier 162 therebetween as shown in FIG. 8. The emulsion side of plate 132 is the uppermost surface to avoid any variation due to parallax. The emulsion side of the plate 134 is the lowermost surface. With the plates 132 and 134 supported by the holder 118, the plates are orientated with respect to one another so that any desired marking on the plates such as "X" may be aligned. Thereafter, the barrier 162 is inserted through the slot 150. The plates 132 and 134 are preferably made of glass.

Thereafter, an image from the photograph supported by structure 62 is formed on the emulsion side of plate 134 by means of the reduction camera 70. Simultaneously therewith, the image on the photograph supported by structure 62' is formed on the emulsion side of the plate 132. These images are illustrated in FIG. 8 as being of different sizes. Thus, the images applied to plate 132 are designated as 166 and those on plate 134 are designated as 168. By manipulation of the hand wheels 94 and 110, a series of said images are applied to the plates 132 and 134 with a uniform error, if any, in orientation repeated on each plate. Hence, the plates 132 and 134 will be moved the same distance in the X or Y direction by the hand wheels, the images will always be identically orientated with respect to one another.

Thereafter, the plates 132 and 134 are removed from the holder 118 and the barrier 162 is removed. The plates 132 and 134 will then be developed in a conventional manner to form photonegatives. Thereafter, the plates 132 and 134 will be replaced in the holder 118 with their surfaces having the exposed images 166 and 168 juxtaposed to one another to avoid parallax for contact printing, but spaced apart by a distance such as about .002 inch. Any necessary reorientation of one plate with respect to the other may be effected by adjusting any one of the limit stops 140, 142, 146 and 148. An X or any other mark on the plates may be utilized for this purpose. Thereafter, the substrate 152 is inserted through the slot 150 so as to be disposed between and juxtaposed to the images on the plates 132 and 134 as shown more clearly in FIG. 7. Substrate 152 may be a metal mask as described above and coated with a photosensitive resist on its opposite faces.

Thereafter, the images 166 and 168 are simultaneously contact printed on opposite faces of the substrate 152. If the images 168 and 166 are identical, they will appear as mirror images on the opposite faces of the substrate 152. With the images 168 and 166 being different, they will appear as orientated images on the opposite faces of the substrate 152. Any errors of orientation between adjacent images on the surface of the substrate 152 will automatically be the same for the orientation between the adjacent images on the opposite surface of the substrate 152. Contact printing procedures for metal etch photosensitive emulsions are well known to those who practice the art.

When all of the desired images have been formed on the substrate 152, substrate 152 may be then subjected to an acid bath wherein the images will be eaten away by the acid. If the images 166 and 168 were of the same size and configuration, the acid bath would eat a hole straight through the substrate 152. When using different sized images of the same configuration as illustrated in FIGS. 8 and 9, the acid bath will produce a stepped hole in the substrate 152. Such stepped holes are desirable in connection with the more recent trends for complex miniaturized circuitry. Thereafter, material associated with the desired circuitry may be put in the holes formed at the areas wherein the acid bath has eaten away the portions of the substrate 152 if the substrate is silicon coated with a silicon-oxide. If the substrate is a metal mask it can be used in accordance with well known methods for manufacturing microcircuits.

The X–Y stage device for displacing the holder 118 and the photographic plates supported thereby have been illustrated and described as being a manual device including hand wheels 94 and 110. If desired, such displacement could be accomplished by interferometers, optical scales, encoders, numerically controlled systems, etc. If desired, the light for exposing the images onto the photo resist surface of the substrate 152 can be a continuous light source with appropriate shutters being provided with a servomechanism to operate the shutters. For purposes of illustration and for purposes of simplicity of design, the light source associated with the reduction printers 70 and 70' is preferably a single triggering mechanism so that the light sources are triggered simultaneously.

The present invention may be embodied in other specific forms without departing from the spirit or essential attributes thereof and, accordingly, reference should be made to the appended claims, rather than to the foregoing specification as indicating the scope of the invention.

It is claimed:

1. In a method for making printing plates useful in making a substrate having orientated images on opposite faces comprising the steps of positioning photographic plates in superimposed relation with their emulsion side on the outer surface, positioning an opaque barrier between the plates, simultaneously printing orientated images on the plates, simultaneously moving said plates and barrier, printing additional orientated images on the plates with a uniform distance between adjacent corresponding images on the plates, and then removing the barrier so that the image side of the plates may be juxtaposed to a substrate on which it is desired to have the images printed onto its opposite faces.

2. A method of duplicating images on opposite sides of a substrate comprising the steps of aligning two photographic plates with each other, positioning an opaque barrier between the photographic plates, recording aligned images on the photographic plates, simultaneously moving the photographic plates, recording additional images on the photographic plates whereby the additional images will be aligned with each other, removing the opaque barrier, from between the photographic plates, inserting a substrate that is light sensitized on opposite sides between the photographic plates and exposing the opposed sensitized sides of the substrate to the images on the photographic plates.

References Cited

UNITED STATES PATENTS

| | | | |
|---|---|---|---|
| 1,632,278 | 6/1927 | Douglass | 355—89 |
| 1,739,886 | 12/1929 | Caps | 355—26 |
| 3,185,026 | 5/1965 | Carlson | 355—77 |
| 3,353,469 | 11/1967 | Grover | 355—86 |

NORTON ANSHER, Primary Examiner

L. H. McCORMICK, Jr., Assistant Examiner

U.S. Cl. X.R.

355—89